H. M. SMITH.
NUT LOCK.
APPLICATION FILED DEC. 10, 1909.
982,392.
Patented Jan. 24, 1911.
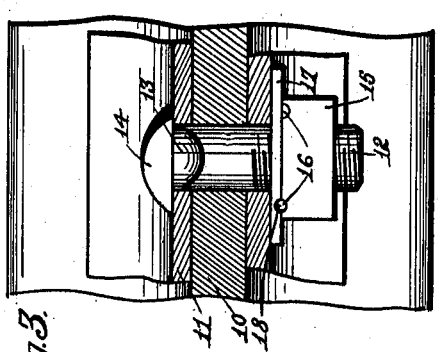
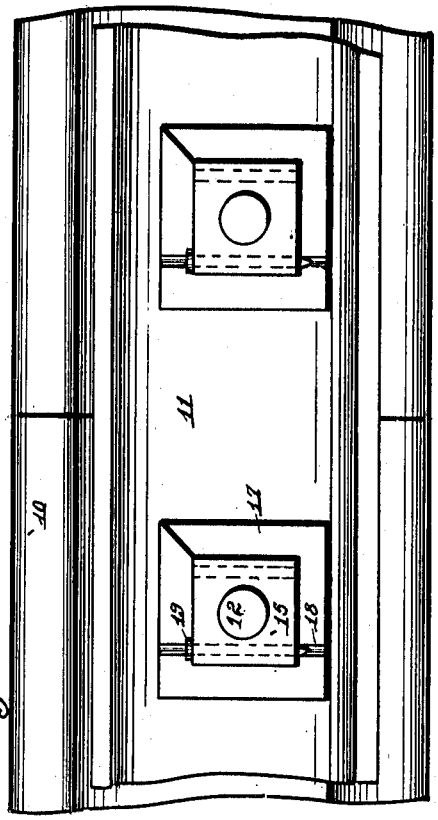
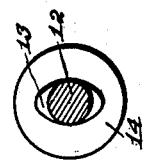
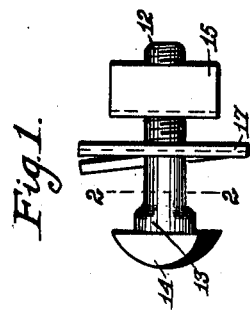
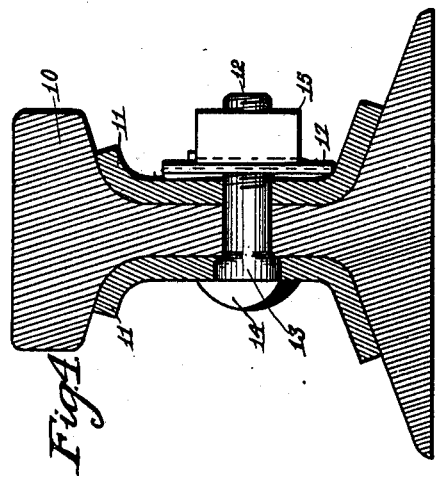
Witnesses.
W. A. Loftus.
A. G. Hague
Inventor.
Henry M. Smith.
by Orwig & Law Atty's.

UNITED STATES PATENT OFFICE.

HENRY M. SMITH, OF GLADBROOK, IOWA.

NUT-LOCK.

982,392. Specification of Letters Patent. Patented Jan. 24, 1911.

Application filed December 10, 1909. Serial No. 532,466.

*To all whom it may concern:*

Be it known that I, HENRY M. SMITH, a citizen of the United States, residing at Gladbrook, in the county of Tama and State of Iowa, have invented a certain new and useful Nut-Lock, of which the following is a specification.

The object of my invention is to provide a nut lock of simple, durable and inexpensive construction so arranged as to attain the advantages of both a split washer and a positive lock in which the locking pin may be readily, quickly and easily inserted after the nut has been screwed tight and when once inserted will firmly and securely hold the nut against rotation and which may, at any time, be quickly and easily removed so that the nut may be unscrewed from the bolt.

My invention consists in the construction, arrangement and combination of the various parts of the device whereby the objects contemplated are attained, as hereinafter more fully set forth, pointed out in my claim and illustrated in the accompanying drawings, in which—

Figure 1 shows a side elevation of a bolt and nut and a washer embodying my invention applied thereto. Fig. 2 shows a sectional view on the line 2—2 of Fig. 1. Fig. 3 shows a horizontal, sectional view of a portion of a railway rail and fish plates thereon with a bolt and nut locking device embodying my invention applied thereto. Fig. 4 shows a vertical, sectional view of same, and—Fig. 5 shows a side elevation of two abutting railway rails and a fish plate and two bolts and nuts provided with my improved locking device applied thereto.

Referring to the accompanying drawings, I have used the reference numeral 10 to indicate a railway rail, and 11 the fish plates applied thereto. In one of said fish plates there is an oval shaped opening to receive a corresponding portion of the bolt to thereby hold the bolt against rotation.

The bolt proper comprises a body portion 12 and an oval shaped lug 13 near the rounded head 14. The nut 15 is of ordinary construction except that it is provided on its inner face with two parallel grooves 16. For each bolt I provide a split washer 17 having one or more straight edges designed to engage the lower flange of a fish plate to thereby hold the split washer against rotation. Said split washer is also provided with a groove 18 in position where one of the grooves 16 in the nut may be brought into position adjacent to and parallel with it as shown in Fig. 3.

The numeral 19 indicates a pin designed to be inserted between the grooves 16 and 18 and when so inserted to prevent the rotation of the nut relative to the split washer.

In practical operation, the bolt is first inserted through the rail and fish plates with the other portion of the bolt resting in the oval shaped opening of the fish plate to thereby prevent rotation of the bolt. Then the split washer is placed on the bolt and the nut screwed on the bolt until it is in position to firmly clamp the parts together. Obviously by this arrangement it is not necessary to provide any means for holding the opposite end of the bolt against rotation and it is obvious also that the split washer cannot turn. Then the nut is moved until one of the grooves 16 therein stands adjacent to the groove 18, whereupon the pin 19 may be placed between said grooves 16 and 18 with its head resting on top of the nut. It is a well known fact that a split washer made of spring metal will expand in case there is any space between the nut and the adjacent portion of the fish plate so as to apply a yielding pressure to both adjacent surfaces. This well known fact is taken advantage of in my invention for the reason that the pin 19 will be thereby held in place even though there is considerable play between the nut and the fish plate and hence the pin will be held in place to prevent rotation of the nut relative to the split washer even though there is considerable play between the nut and the fish plate. It is essential that there be a means such as the oval portion on the bolt to prevent the bold from turning, a split spring washer with a groove in it and a nut also having a groove in order to accomplish the purposes desired for the reason that if the bolt were permitted to turn the pin might turn with the head down and thereby drop out or if there were no coacting grooves in the washer and nut then the nut might turn, and if there were no spring feature to the washer then after slight wear between the parts the nut and washer could move apart far enough to permit the loosening of the pin. Hence all of the above named features are essential in the combination to accomplish the result desired. Furthermore by having the grooves in the nut arranged to extend from one side of the nut to the other without going through the bolt it is obvious that the said pins may be readily and easily removed for the purpose of unscrewing the nut.

I claim as my invention—

An improved nut lock, comprising a bolt, means for preventing a rotation of the bolt, a split spring washer on the bolt, a nut on the bolt, the adjacent faces of the nut and the washer being provided with grooves to coincide with each other, and a headed pin capable of being inserted in the opening formed by the coinciding grooves, said parts being so arranged that when the nut is first applied to the bolt the articles between the washer and the head of the bolt may be unyieldingly engaged and after wear has taken place the said split spring washer may expand to yieldingly hold the pin within the groove of the nut, for the purposes stated.

Des Moines, Iowa, Nov. 20, 1909.

HENRY M. SMITH.

Witnesses:
G. W. BERRY,
H. H. WENTZIEN, Jr.